United States Patent [19]

Taylor

[11] 4,220,039
[45] Sep. 2, 1980

[54] FLUID TEMPERATURE COMPENSATOR CIRCUIT FOR A THERMAL GAUGE PROBE

[76] Inventor: Julian S. Taylor, 8300 SW. 8, Oklahoma City, Okla. 73108

[21] Appl. No.: 62,382

[22] Filed: Jul. 31, 1979

Related U.S. Application Data

[63] Continuation-in-part of Ser. No. 918,879, Jun. 26, 1978, abandoned.

[51] Int. Cl.³ .................. G01F 1/68; G01N 25/00
[52] U.S. Cl. .................................. 73/15 R; 73/204
[58] Field of Search ......... 73/15 R, 15 A, 53, 61.1 R, 73/204

[56] References Cited

U.S. PATENT DOCUMENTS

| | | | |
|---|---|---|---|
| 2,780,094 | 2/1957 | Fink | 73/53 |
| 3,354,052 | 11/1967 | Williams | 73/53 |
| 3,712,116 | 1/1973 | Andre | 73/53 |
| 4,016,758 | 4/1977 | Taylor | 73/204 |

Primary Examiner—Donald O. Woodiel
Attorney, Agent, or Firm—Robert K. Rhea

[57] ABSTRACT

A circuit including an amplifier and resistance thermal device is interposed in and supplements the heat dissipation measuring circuit of a fluid thermal gauge probe for detecting the actual temperature of a fluid medium under test in a closed system and adjusting the output of the thermal gauge probe circuit in accordance with the fluid temperature in order to differentiate between fluids.

3 Claims, 5 Drawing Figures

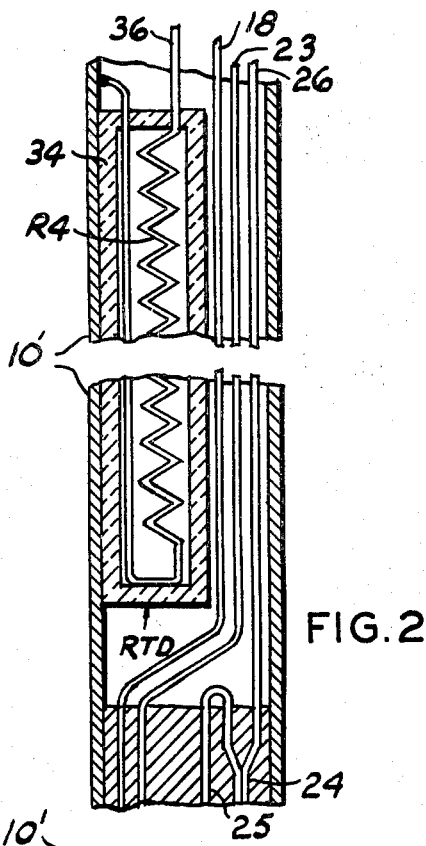
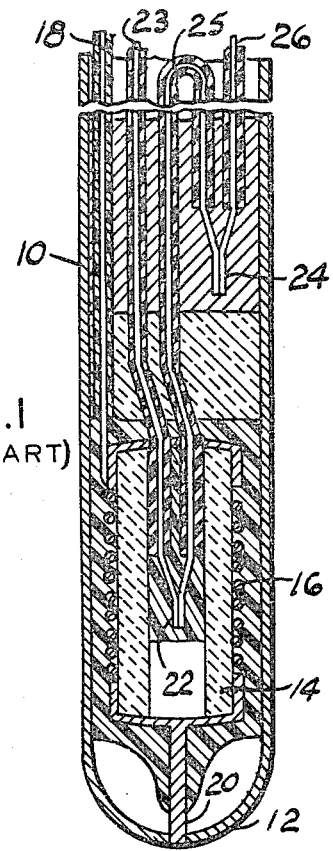
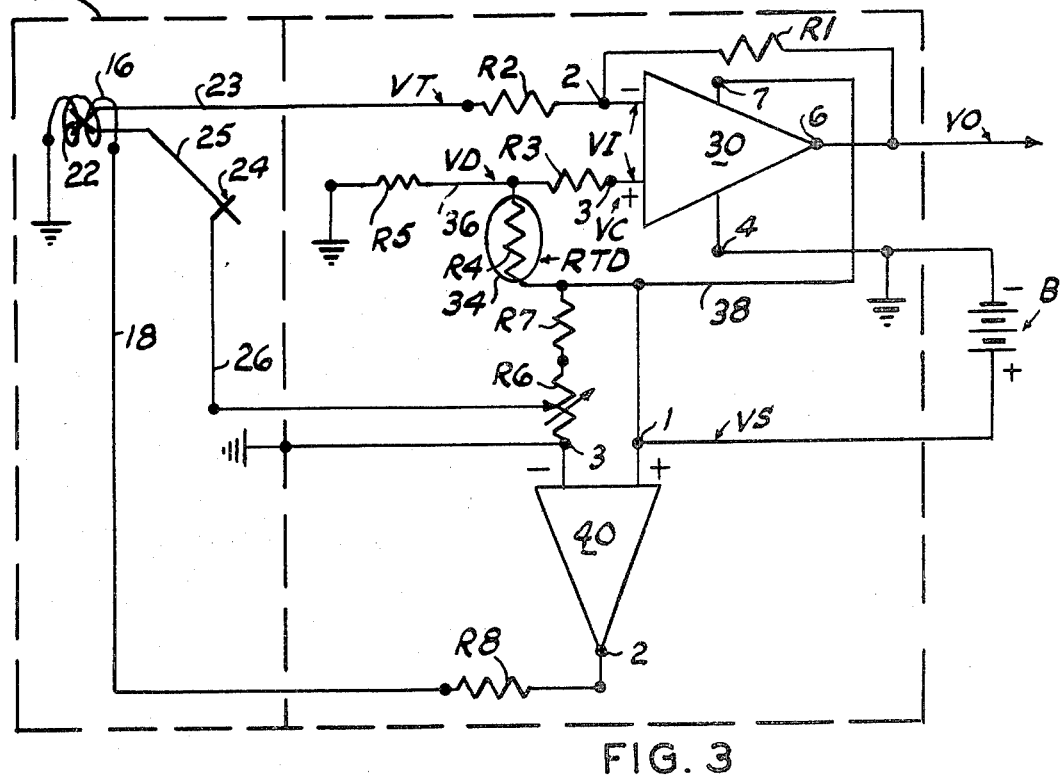
FIG. 1 (PRIOR ART)
FIG. 2
FIG. 3

FLUID TEMPERATURE COMPENSATOR CIRCUIT FOR A THERMAL GAUGE PROBE

CROSS REFERENCE TO RELATED APPLICATION

The present invention is a continuation-in-part of an application filed by me in the U.S. Patent and Trademark Office on June 26, 1978 under Ser. No. 918,879 for FLUID TEMPERATURE COMPENSATOR CIRCUIT FOR A THERMAL GAUGE PROBE, now abandoned.

BACKGROUND OF THE INVENTION

1. Field of the Invention

The present invention relates to fluid temperature and flow rate detecting thermal gauge probes and more particularly to a fluid temperature detecting and compensating circuit interposed in a thermal gauge probe circuit.

2. Description of the Prior Art

The terminal gauge probe disclosed by U.S. Pat. No. 4,016,758, when inserted into a closed system containing fluids, determines the thermal conductivity of the fluids with relative accuracy, thus monitoring flow rate of liquids or gases of different thermal conductivities, however, due to variations in thermal conductivity with temperature it does not adequately perform these functions at all temperatures. In order to function practically in industrial applications it must be immune to temperature variations in the liquid or gas being monitored. Since the thermal conductivity of oil at 100° C. is approximately equal to the thermal conductivity of water at 1° C. a means of temperature compensation is necessary to sense the actual fluid temperature and correct or compensate the output signals of such a thermal gauge probe accordingly.

This invention provides a temperature sensing and electrical signal compensating function which adjusts a thermal gauge probe output in accordance with the temperature of the fluid under test and more specifically in distinguishing between oil and water within the temperature range of 0° to 100° C..

SUMMARY OF THE INVENTION

A conventional operational amplifier used as an analog logic device is provided with a feedback resistor to fix the gain of the amplifier. A resistance thermal device and other resistors provide an offset or compensated input voltage to the amplifier. The resistance thermal device is inserted into and becomes a part of that portion of the thermal gauge probe surrounded by fluid under test in a close system so that the resistance thermal device with the other resistors applies a voltage to the amplifier in a uniform manner in accordance with the actual temperature and composition of the fluid under test.

The principal object of this invention is to provide a fluid temperature detecting and compensating circuit to be interposed in the circuit of a thermal gauge probe for amplifying and adjusting the probe output signal according to the actual temperature and composition of the fluid such as oil and water over a preselected temperature range.

BRIEF DESCRIPTION OF THE DRAWINGS

FIG. 1 is a fragmentary longitudinal cross sectional view of a prior art thermal gauge probe;

FIG. 2 is a fragmentary longitudinal sectional view illustrating the relative position of the resistance thermal device when installed in a thermal gauge probe;

FIG. 3 is a diagram;

DESCRIPTION OF THE PREFERRED EMBODIMENT

Figure 4:
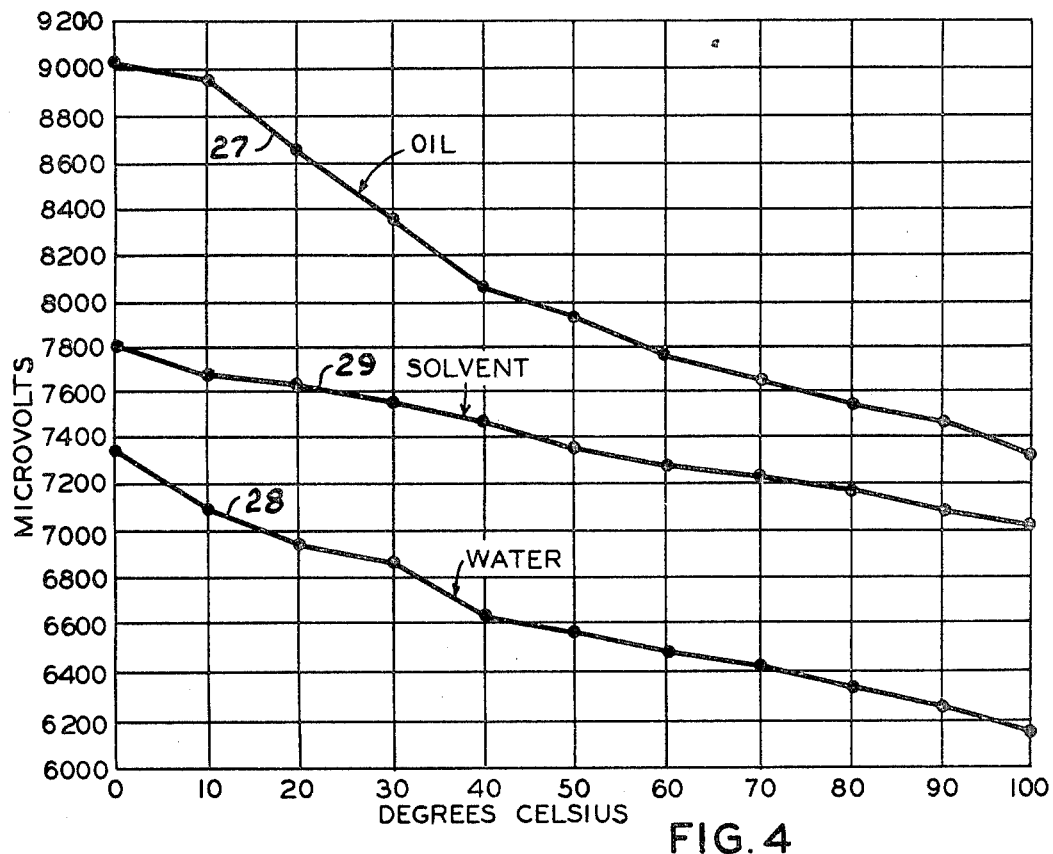
FIG. 4 is a graph illustrating the curve of fluids tested by the prior art thermal gauge probe; and, FIG. 5 is a graph illustrating the curve of the same fluids of FIG. 4 when tested with the same thermal gauge probe combined with the temperature compensating circuit.

Like characters of reference designate like parts in those figures of the drawings in which they occur.

In the drawings:

Referring to the prior art thermal gauge probe of FIG. 1, the reference numeral 10 indicates a small diameter tube having a closed end 12. Adjacent its closed end the tube 10 contains a ceramic core 14 which is surrounded by a heating coil 16 supplied with electrical energy from a battery B (FIG. 3) by a heater wire 18 connected with one end of the coil. The other end of the coil 16 is connected with a prong 20 in turn connected with the tube end 12 to ground the coil. A first thermocouple 22, having one constantan lead 23 connected with readout instruments, not shown, is disposed within the ceramic tube 14. A second or reference thermocouple 24 is connected in series with the first thermocouple 22, by a common iron lead 25, and disposed in spaced relation with respect to the first thermocouple. The other or constantan lead 26 of the second thermocouple extends to the readout instruments. Both thermocouples 22 and 24 and the periphery of the ceramic tube are surrounded with thermal insulating material and obviously the heater wire 18 and thermocouple leads are electrically insulated. With a fixed wattage applied to the heater coil 16, heat dissipation to the stream of fluid surrounding the fluid probe 10, permits calculation of the thermal conductivity which is relative to mass flow rate. The second thermocouple 24 senses the temperature variations of surrounding fluid and partially cancels out the electromotive force of the first thermocouple 22 thus providing a temperature readout at a given time for obtaining the mass flow rate. However, as set forth hereinabove, a probe of this type does not adjust the thermocouple electromotive force in accordance with the variations in thermal conductivity with temperature in the fluid sufficiently to differentiate between fluids, particularly oil and water. For example, as shown by the graph of FIG. 4, the thermocouple electromotive force readout of a noncompensated thermal gauge probe when immersed in oil 27 declines from 9020 microvolts at 0° C. to 7380 at 100° C.. The 7380 microvolts of oil at 100° C. is substantially equivalent to water 28 at 0° C. the water declining to 6180 microvolts at 100° C.. A solvent 29 was similarly tested as a control.

The curve for water as shown by FIG. 4 declines substantially 1200 microvolts as the temperature rises from 0° to 100° C. or −0.012 millivolts per degree Centigrade. The curve for oil declines substantially −0.017 mV/°C.. As a compromise between actual correction factors in laboratory tests the correctional factor of 0.0145 mV/°C. was chosen, which under ideal conditions, will slightly under compensate for temperature rise in oil and somewhat over compensate for temperature rise in water. The circuitry, presently described, and the equation set forth hereinbelow, are based on a correctional factor of 0.0145 mV/°C.. In practice this correctional factor can be varied for fluids (or gases) other than oil or water by changing the value of resistor R5 (FIG. 3) to suit the medium under test in accordance with its predetermined properties.

In practicing the invention and referring more particularly to FIGS. 2 and 3, a conventional operational amplifier 30, known as the Burr-Brown No. 3527BM, is used. A feedback resistor R1 connects the amplifier inverting input pin 2 to its output terminal 6 to fix the gain of the amplifier. Input pin 2 is connected to the lead 23 of the first thermocouple 22 through a resistor R2 to provide thermocouple voltage VT.

A resistor R3 is connected to the amplifier non-inverting pin 3. A conductor 36 connects the resistor R3 to ground in series through a resistor R5.

A resistance thermal device RTD is connected to the conductor 36 between the resistors R3 and R5. As shown by FIG. 2, the RTD assembly is installed in the probe tune 10' in spaced relation with respect to the second thermocouple 24. The RTD assembly includes a platinum coil resistor R4 within a glass jacket 34. The resistance of R4 is dependent on temperature and is expressed in ohms as: $100+(0.38\,T)$ where T is the temperature in degrees Centigrade. The other end of the RTD resistor R4 is connected to the amplifier pin 7 by a conductor 38. The RTD and resistor R5 provides a divider voltage VD.

A conventional eight volt regulator, marketed under the trade name National No. LM340T-8.0, indicated at 40, has its positive input pin 1 connected to the positive terminal voltage supply VS of the battery B and to the conductor 38. The negative terminal of the battery B is connected with the input terminal 4 of the amplifier 30. The negative terminal pin 3 of the voltage regulator 40 is grounded to the probe tube 10' and connected with the conductor 38, between its connection with the pin 1 of the voltage regulator 40 and the resistance thermal device RTD through a series connected adjustable resistor R6 and a seventh resistor R7. The reference thermocouple lead 26 is connected with the adjustable contact of the resistor R6. The output pin 2 of the voltage regulator 40 is connected with the heater coil lead 18 through a current limiting resistor R8.

The equation which shows the amplifier output VO, in volts, as established by the amplifier manufacturer, (excluding the offset adjustment to be introduced through resistors R6 and R7) is:

$$VO = (VT - VC)\frac{R1}{R2} \quad [1]$$

or inserting values:

$$VO = \left\{ (K - 0.0000145T) - \left[\left(\frac{VS}{R5 - R4}\right) R5\right] \right\} \frac{R1}{R2} \quad [2]$$

where:
VT (thermocouple voltage) = $K - 0.0000145\,T$;
K is a constant proportional to the thermal conductivity of the medium at 25° C.;
T is the temperature of the medium in degrees Centigrade;
0.0000145 is the average temperature change of oil and water in volts/°C.;
VC (offset voltage) = VD (divider voltage) = (VS/R5 R4) R5;
VS (applied voltage) = 12 volts; and,
VT − VC = V' (input voltage applied to the amplifier 30).
VO (amplifier output voltage) = (R1/R2) VI.

Preferred resistor values in ohms are as follows:
R1, 1000K; R2, 10K; R3, 10K; R4, $100+(0.38\,T)$ where T is the temperature in degrees Centrigrade; R5, 315K; and R8, 10. The value of R6 and R7 is chosen to set the voltage level of the two thermocouples 22 and 24 at a desired value and hence the voltage level of VT in order to simplify the circuitry for accepting the signal from the probe 10'.

It is important that regardless of VT, the thermocouple voltage or the offset voltage VC should be 1.45 mV greater at 100° C. than at 0° C. or 0.0000145 mV per degree Centigrade in order to counteract the effect of temperature change on the thermal conductivity of oil. This is needed for full scale correction for the probe output since VT will increase in value or go up approximately 1.45 mV from 100° C. through 0° C.. When both inputs go up and down together VT-VC, (VI), remains constant with the temperature so that the only variable in the input is K which is dependent on the property of the fluid medium. VC tracks VT by exposing the platinum RTD coil R4 to the ambient temperature of the reference thermocouple 24. Therefore, the compensating network R3, R4 and R5 applies the correctional voltage VC to the amplifier pin 3. The resistance of R5 produces the necessary variation in the divider voltage VD with temperature.

Inserting the remaining actual values in equation [2] and solving: when T=0° C.; VO=(K−11.9962) 100; and when T=100° C.; VO=(K−11.9962)100. Therefore, at 0° C. and at 100° C. the output VO of the amplifier 30 is exactly the same except for K. Since almost every fluid has a different K the output of the thermal gauge probe 10' is effective to differentiate between any number of fluids by simply reading the output VO of the probe when it is immersed in a fluid medium under test and comparing that output with the known K value of that medium. In like manner the probe 10' can be used to determine flow rate because effective thermal conductivity rises rapidly with increase in flow rate.

Figure 5:
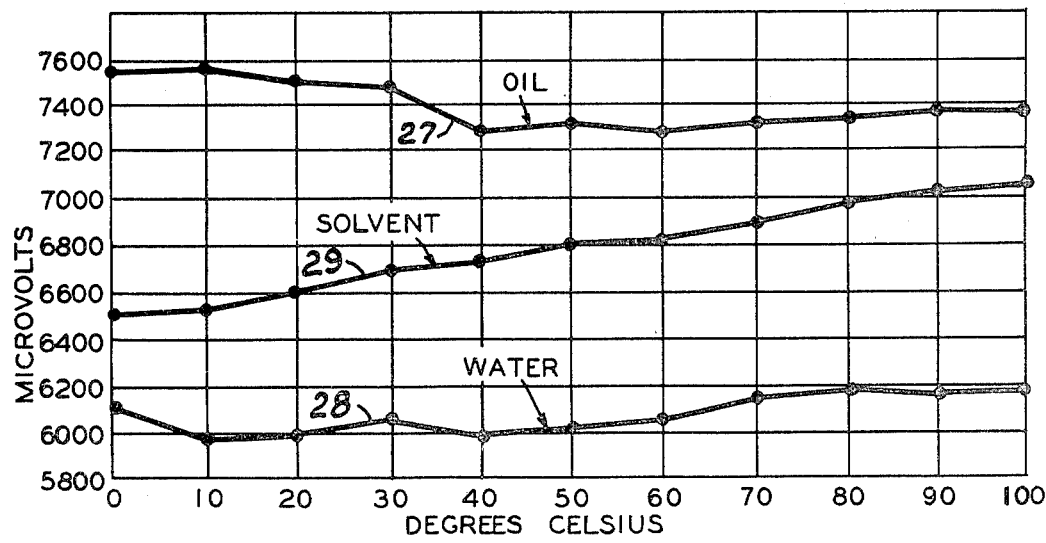

The graph of FIG. 5 illustrates the results obtained by the temperature compensated probe 10' when testing the same three fluids, oil, a solvent and water, under the identical conditions of the test illustrated by the graph of FIG. 4. As may be seen by an examination of FIG. 5 the curves of the three fluids remain distinct from each other throughout the temperature range of 0° C. to 100° C..

Obviously the invention is susceptible to changes or alterations without defeating its practicability. Therefore, I do not wish to be confined to the preferred embodiment shown in the drawings and described herein.

I claim:
1. In combination with
    a tubular thermal gauge probe having a heater connected with a source of electrical energy and disposed within one fluid entering closed end portion and having a first thermocouple disposed within the heater, a second thermocouple within said probe and connected in series with said first thermocouple in thermally insulated relation, one lead of said first thermocouple and one lead of said second thermocouple extending beyond the other end of said probe, the improvement comprising:

amplifying means connected with the source of electrical energy and said one lead of said first thermocouple;

voltage divider means including a resistance thermal device interposed between said second thermocouple and said amplifying means for applying a constant value correctional voltage to said amplifying means as a function of fluid temperature; and, voltage regulator means including a voltage regulator connecting the source of electrical energy with said heater, said one lead of said second thermocouple and said voltage divider means.

2. The combination according to claim 1 in which said resistance thermal device is disposed within said probe adjacent said second thermocouple.

3. The combination according to claim 2 and further including:

at least one resistor interposed between said voltage regulator and said voltage divider means and connected with said one lead of said second thermocouple for referencing the voltage level of said first and said second thermocouples.

* * * * *